United States Patent
Ekstrom et al.

(10) Patent No.: US 7,447,304 B2
(45) Date of Patent: *Nov. 4, 2008

(54) SYSTEM AND METHOD FOR ROUTING BOTH TOLL-FREE AND CALLER-PAID TELEPHONE CALLS TO CALL SERVICE CENTERS

(75) Inventors: Gayle Roberta Ekstrom, Chicago, IL (US); Robert Francis Manning, West Dundee, IL (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 4 days.

This patent is subject to a terminal disclaimer.

(21) Appl. No.: 11/709,314

(22) Filed: Feb. 21, 2007

(65) Prior Publication Data

US 2008/0019498 A1 Jan. 24, 2008

Related U.S. Application Data

(63) Continuation of application No. 11/322,444, filed on Dec. 29, 2005, now Pat. No. 7,224,789, which is a continuation of application No. 09/097,186, filed on Jun. 12, 1998, now Pat. No. 7,006,620.

(51) Int. Cl.
*H04M 3/00* (2006.01)
*H04M 7/00* (2006.01)

(52) U.S. Cl. ............................. 379/265.03; 379/220.01; 379/266.06

(58) Field of Classification Search ................. 379/145, 379/212.01, 220.01, 221.08, 221.15, 222, 379/229, 215.01, 265.03, 265.01, 265.02, 379/266.01–266.06

See application file for complete search history.

(56) References Cited

U.S. PATENT DOCUMENTS

| 4,400,587 | A | 8/1983 | Tayler et al. |
| 4,757,267 | A | 7/1988 | Riskin |
| 4,953,204 | A | 8/1990 | Cuschleg, Jr. et al. |
| 5,097,528 | A | 3/1992 | Gursahaney et al. |
| 5,164,983 | A | 11/1992 | Brown et al. |
| 5,274,700 | A | 12/1993 | Gechter et al. |
| 5,291,550 | A | 3/1994 | Levy et al. |
| 5,309,513 | A | 5/1994 | Rose |
| 5,311,572 | A | 5/1994 | Friedes et al. |

(Continued)

OTHER PUBLICATIONS

Preferred Solutions Internet Publication downloaded from www.prefsolutions.com, entittled "The Call Center Directory—Technology," 1997, 1-3.

(Continued)

*Primary Examiner*—Harry S Hong
(74) *Attorney, Agent, or Firm*—Brinks Hofer Gilson & Lione

(57) ABSTRACT

A system and method of routing both caller-paid and toll-free telephone calls includes a local exchange network and an interexchange network in communication with a call routing processor. The call routing processor receives status information on at least two call service centers and provides routing instructions to both the interexchange and local exchange networks. The method includes the steps of a call controller in a local exchange network communicating with a call routing processor also in communication with an interexchange network, the call controller identifying calls to call service centers and requesting instructions from the call routing processor.

12 Claims, 4 Drawing Sheets

U.S. PATENT DOCUMENTS

| | | |
|---|---|---|
| 5,335,268 A | 8/1994 | Kelly, Jr. et al. |
| 5,335,269 A | 8/1994 | Steinlicht |
| 5,377,186 A | 12/1994 | Wegner et al. |
| 5,444,774 A | 8/1995 | Friedes |
| 5,450,482 A | 9/1995 | Chen et al. |
| 5,452,350 A | 9/1995 | Reynolds et al. |
| 5,467,391 A | 11/1995 | Donaghue, Jr. et al. |
| 5,519,772 A | 5/1996 | Akman et al. |
| 5,524,147 A | 6/1996 | Bean |
| 5,530,744 A | 6/1996 | Charalambous et al. |
| 5,533,108 A | 7/1996 | Harris et al. |
| 5,533,115 A | 7/1996 | Hollenbach et al. |
| 5,546,452 A | 8/1996 | Andrews et al. |
| 5,555,299 A | 9/1996 | Maloney et al. |
| 5,590,188 A | 12/1996 | Crockett |
| 5,592,541 A | 1/1997 | Fleischer, III et al. |
| 5,592,542 A | 1/1997 | Honda et al. |
| 5,619,557 A | 4/1997 | Van Berkum |
| 5,633,924 A | 5/1997 | Kaish et al. |
| 5,657,383 A | 8/1997 | Gerber et al. |
| 5,675,637 A | 10/1997 | Szlam et al. |
| 5,684,870 A | 11/1997 | Maloney et al. |
| 5,692,033 A | 11/1997 | Farris |
| 5,703,943 A | 12/1997 | Otto |
| 5,870,464 A | 2/1999 | Brewster et al. |
| 5,901,214 A | 5/1999 | Shaffer et al. |
| 5,915,012 A | 6/1999 | Miloslavsky |
| 5,923,745 A | 7/1999 | Hurd |
| 7,006,620 B1 * | 2/2006 | Ekstrom et al. ........ 379/265.03 |
| 7,224,789 B2 * | 5/2007 | Ekstrom et al. ........ 379/265.03 |

OTHER PUBLICATIONS

GeoTel Communications Corporation, Intelligent CallRouter ®: Managing the Interaction Between Customer and Answering Resources; 1997; pp. 1-9.

GeoTel Communications Corporation; product literature for GeoTel Enterprise CTI™: Bringing Enterprise Data to the Agent's Desktop; pp. 1-6; published prior to Jun. 12, 1998.

GeoTel Communications Corporation; Corporate and Product Overview, 1996.

GeoTel Communications Corporation, GeoTel Intelligent CallRouter® Product Overview; pp. 1-6; published prior to Jun. 12, 1998.

Aspect Communications; Internet publication downloaded from www.aspect.com entitled Aspect Integrated Call Center Solutions; 1997; pp. 1-3.

Davox Corporation; Internet publication downloaded from www.davox.com entitled Unison®: A Comprehensive Call Center Solution; pp. 1-5; dated Jan. 7, 1998.

Lucent Technologies; Internet publication downloaded from ww.wlucent.com entitled Definity® ECS Call Center; 1996; pp. 1-6.

GeoTel Communications Corporation; Internet publication downloaded from www.geotel.com describing the GeoTel Intelligent CallRouter®; 1995-1997.

* cited by examiner

SYSTEM AND METHOD FOR ROUTING BOTH TOLL-FREE AND CALLER-PAID TELEPHONE CALLS TO CALL SERVICE CENTERS

This application is a continuation of U.S. application Ser. No. 11/322,444 filed Dec. 29, 2005 now U.S. Pat. No. 7,224,789, which is a continuation of U.S. application Ser. No. 09/097,186, filed Jun. 12, 1998 now U.S. Pat. No. 7,006 620, issued, each of which is hereby incorporated by reference in its entirety.

BACKGROUND OF THE INVENTION

The present invention relates to managing telephone calls directed to call service centers. More particularly, the present invention relates to a system and method for routing both toll-free and caller-paid telephone calls to call servicing centers.

Many business enterprises make use of toll-free numbers, such as 800, 877 or 888 numbers, to provide customers with call services that allow customers to dial in and speak to company representatives or hear a recording. The call service is supported by one or more call service centers that may handle such functions as product ordering, dissemination of product information, or general company information. Customers typically expect prompt attention to their inquiries and thus may avoid doing business with companies that use telephone services which place customers on hold for extended periods of time. Both the customer and the company providing the call service desire efficient call distribution and handling.

If a company has a call service that uses a single call center with a group of agents available at one location, the company provides its customers with a toll-free number that is routed to an automatic call distribution device (ACD). The ACD is linked to the various agents at the call service center and can route calls based on agent availability and expertise. While this method of call distribution is effective for handling telephone calls directed to a single call center having agents in the same geographical area, it does not address the need for handling calls over a toll-free line to a business enterprise having multiple call centers in various geographical locations.

One solution to managing multiple call service centers that are geographically dispersed is provided by the GEOTEL Intelligent CallRouter® (ICR). The ICR service provides interfaces to multiple carrier networks and provides call routing to agents at call service centers independent of the particular toll-free network provider used. Present telephone systems utilize the ICR to manage incoming call center traffic over toll-free lines and do not address caller-paid calls (i.e., calls billed to the caller). Business enterprises that offer call services may wish to use a local telephone number to maintain a local presence to their customers even though the local number may connect to a call service center in another geographical location. Additionally, toll-free numbers can be a large expense for a business enterprise and some businesses may choose to convert more of their telephone traffic to regular telephone numbers if the local (caller-paid) numbers can offer the same level of service to their calling customers.

Accordingly, there is a need for an improved system and method for managing call distribution to call service centers that can handle both caller-paid and toll-free telephone calls.

DETAILED DESCRIPTION OF THE PRESENTLY PREFERRED EMBODIMENTS

Figure 1:
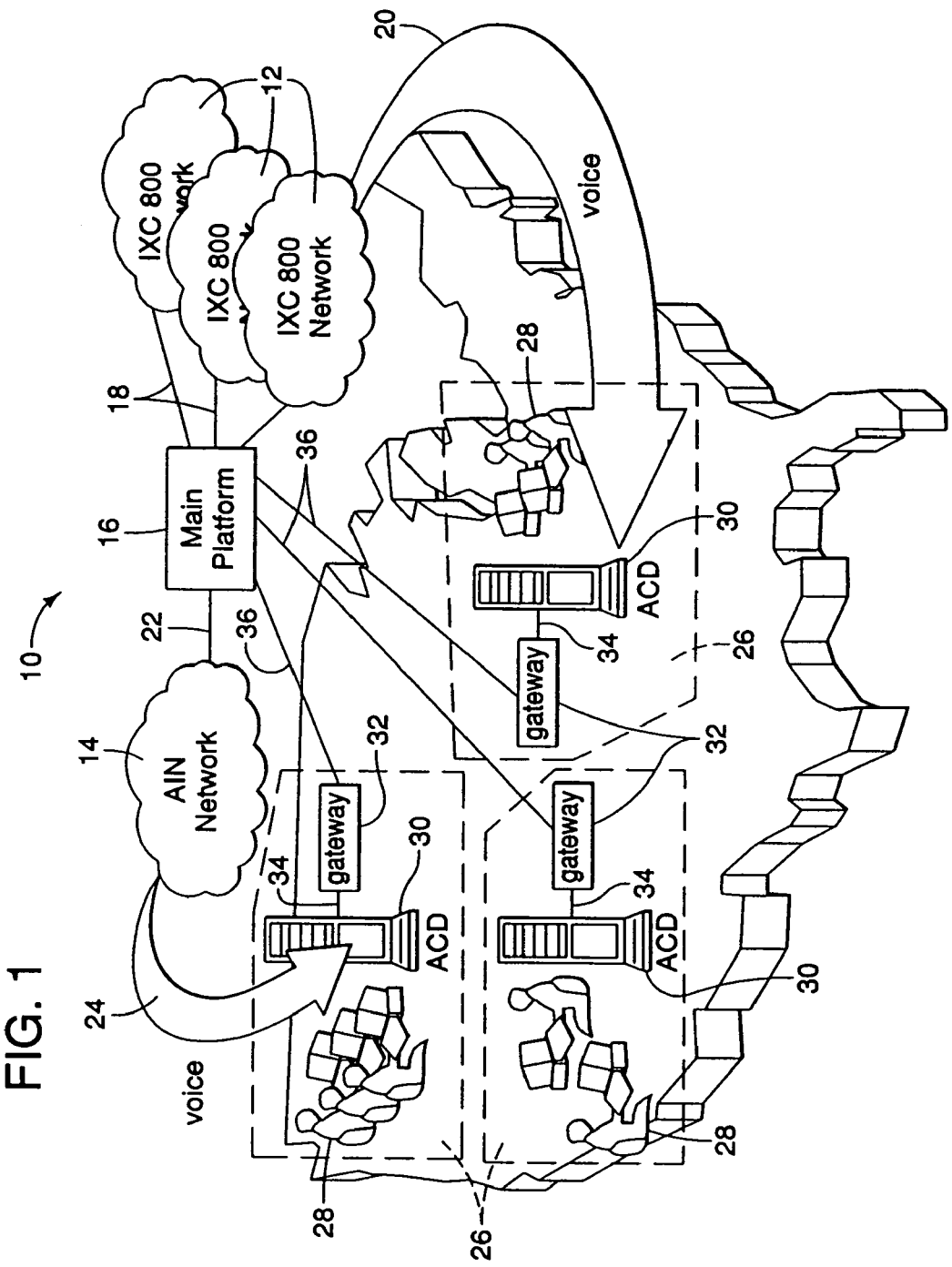
FIG. 1 is an illustration of a system for managing caller-paid and toll-free telephone calls according to one embodiment of the invention.

FIG. 1 illustrates an embodiment of a system for routing both toll-free and caller-paid telephone calls according to the present invention. The system 10 includes one or more interexchange networks 12, a local exchange network 14 and an intelligent processing platform (IPP) 16. The interexchange networks 12 may be any one of a number of telephone systems that handle toll-free telephone calls, typically 800, 877 or 888 telephone calls, and handle transport of telephone calls across local access transport area (LATA) boundaries. The interexchange networks 12 communicate with the IPP 16 via data channels 18. The interexchange networks 12 carry telephone voice and data information over voice channels 20. The local exchange network 14 also communicates with the IPP 16 via a data channel 22. Voice and information from a caller utilizing a local exchange network 14 is transmitted over voice lines 24.

The system 10 also includes a call service having at least two call service centers 26 positioned in different geographical locations. Each call service center 26 includes a group of agents 28. An automatic call distributor (ACD) 30 receives data information regarding the voice lines 20, 24 utilized by the local exchange network 14 or interexchange network 12. The ACD 30 also routes the incoming call to the appropriate agent 28. The ACD 30 keeps track of, among other things, the status of agents and the estimated wait time for reaching an agent. Any of a number of commonly available ACDs may be used. Examples of suitable ACDs 30 are the Lucent Technologies Definity ACD and the Meridian from Northern Telecom Limited. In one alternative embodiment, a local central office switch such as a Lucent Technologies 5ESS may provide the services of a typical ACD. The ACD 30 may be a stand-alone device or integrated with a private branch exchange (PBX).

Each ACD 30 is preferably connected to a gateway 32 via a datalink 34. The gateway 32 is also linked via a data line 36 to the IPP 16. Each gateway 32 contains software specific to the type of ACD 30 capable of translating agent status information maintained at the ACD 30 into a format understandable by the IPP 16. In this manner, various types of ACDs 30 may be used in the system 10. The IPP 16 may be a single processor or a distributed network maintaining a log of agent 28 status at the various geographical locations based on information provided from the ACDs 30 to the gateway 32. The IPP 16 processes the information from the gateways 32 to provide a centralized control of call distribution from the interexchange networks 12 and local exchange network 14.

Suitable devices for the IPP may be a GeoTel Communications ICR or a Genesys Telecommunication Laboratories Intelligent Call Distributor.

Figure 2:
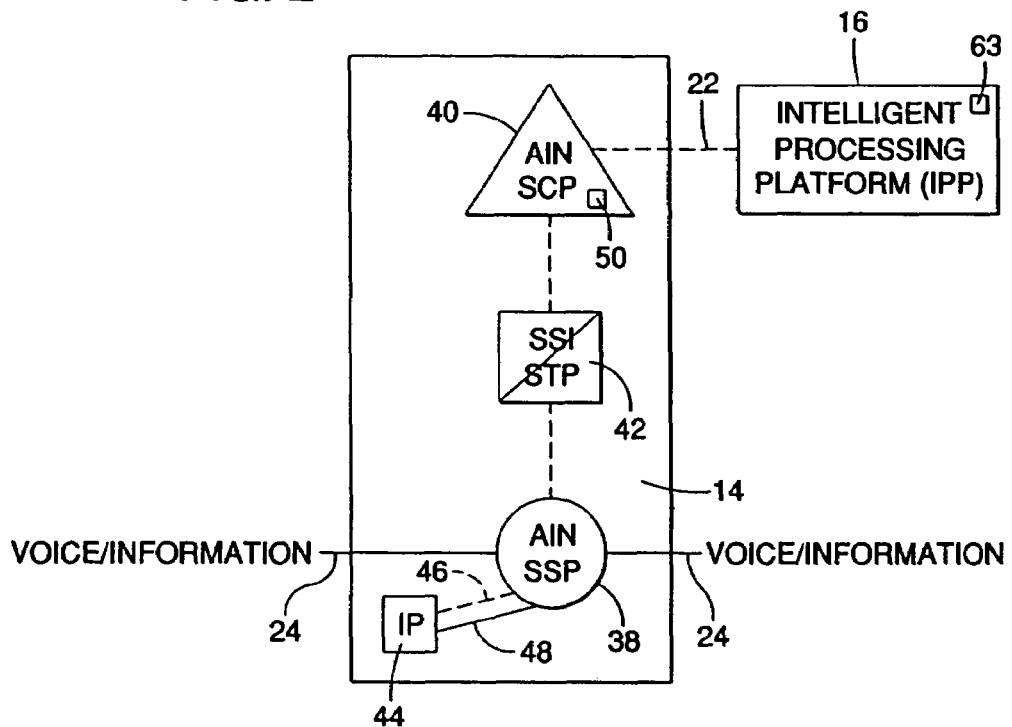
FIG. 2 is a block diagram of an advanced intelligent network for use in the system of FIG. 1.

FIG. 2 illustrates a preferred local exchange network 14 having advanced intelligent network (AIN) capabilities. The local exchange network 14 includes one or more end office switches equipped as AIN service switching points (SSP) 38. The SSP 38 is a programmable switch having the ability to recognize AIN triggers for calls requiring special services. The SSP 38 may be an end office or tandem switch and communicates with a service control point (SCP) 40. An end user may be connected to the SSP 38 over a voice/information channel 24 such as an ordinary telephone line. Multiple connections and combinations of network elements are usable in the local exchange network 14. For example, an end user may also connect to an SSP 38 through one or more ordinary telephone switches.

The SCP 40 is a network element in the AIN local exchange network 14 containing logic and data necessary to provide the functionality required for the execution of a desired communication service. An SCP 40 generally permits separation of service logic from switching functionality such that additional services may be developed without the need to provision software in each individual SSP 38. A suitable SCP 40 is the Advantage SCP manufactured by Lucent Technologies. The SCP 40 is preferably in communication with the SSP 38 via a signal transfer point (STP) 42. The STP 42 routes signals between different network elements. A suitable data signaling standard for use with the STP is the American National Standards Institute (ANSI) signaling system number 7 (SS7). The SCP 40 preferably communicates with the IPP 16 over a data line 22. The SSP 38 in the local exchange network 14 may communicate with an intelligent peripheral 44 over a data 46 or voice 48 channel.

The IP 44 is a network element of the AIN that contains resources to exchange information with an end user and perform other functions such as call origination and tone generation. The IP 44 provides special resources for interactions between the end user and the network such as dual tone multi-frequency (DTMF) recognition, playing pre-recorded announcements and tone generation. A service node/intelligent peripheral (SN/IP) platform manufactured by Comverse Technology, Inc. is suitable for use with the AIN local exchange network 14. Although the local exchange network 14 illustrated in FIG. 2 shows only one of each network element, those of ordinary skill in the art understand that the presently preferred system and method may include more complex networks having a plurality of interconnected SCPs, IPs, STPs, and SSPs.

Figure 3:
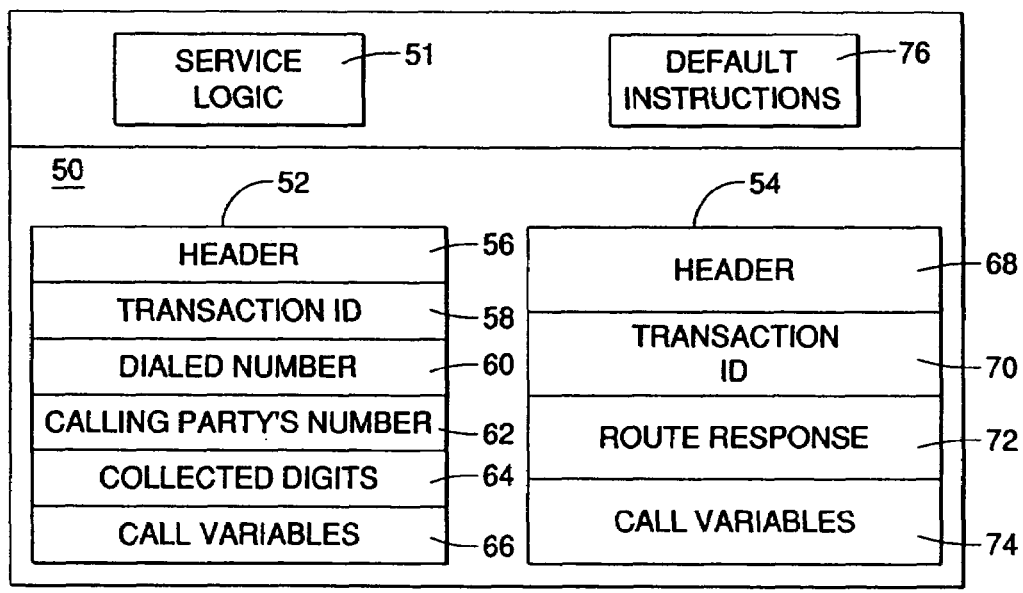
FIG. 3 is a block diagram of an intelligent processing platform interface.

Referring to FIG. 2, the SCP 40 preferably includes an IPP interface 50 for generating messages to, and interpreting messages from, the IPP 16. As shown in FIG. 3, the IPP interface 50 generates a routing query message 52 and expects a routing response message 54 in return. The routing query message includes a message header 56 and a transaction ID 58 identifying the type of message and a unique number assigned to the telephone call, respectively. The routing query message 52 also includes the dialed number 60 and the calling party's number 62. The routing query message 52 may optionally include a segment containing collected digits 64 so that any digits collected through a play and collect menu in the local exchange network 14 may be passed on through the agent 28 at the call service center 26 assigned to the telephone call. Another optional field in the routing query message is an optional parameter field 66 which may be used for future expansion and adaptability of the network 10. The routing response message 54 also includes a header 68 and transaction ID 70 along with the route response 72 generated by the IPP 16. Additionally modified or new parameters 74 are optionally included in the message returned by the IPP 16. The route response 72 may be a ten digit number or a trunk group identifier with outpulse digits. The IPP interface 50 also preferably includes default instruction logic 76 for routing a caller-paid telephone call originating in the local exchange network to one of the service centers 26 in the event that there is no response from the IPP 16. In one embodiment, the interface between the SCP 40 and the IPP is TCP/IP. Other communication interfaces, such as SS7 may also be used.

Figure 4:
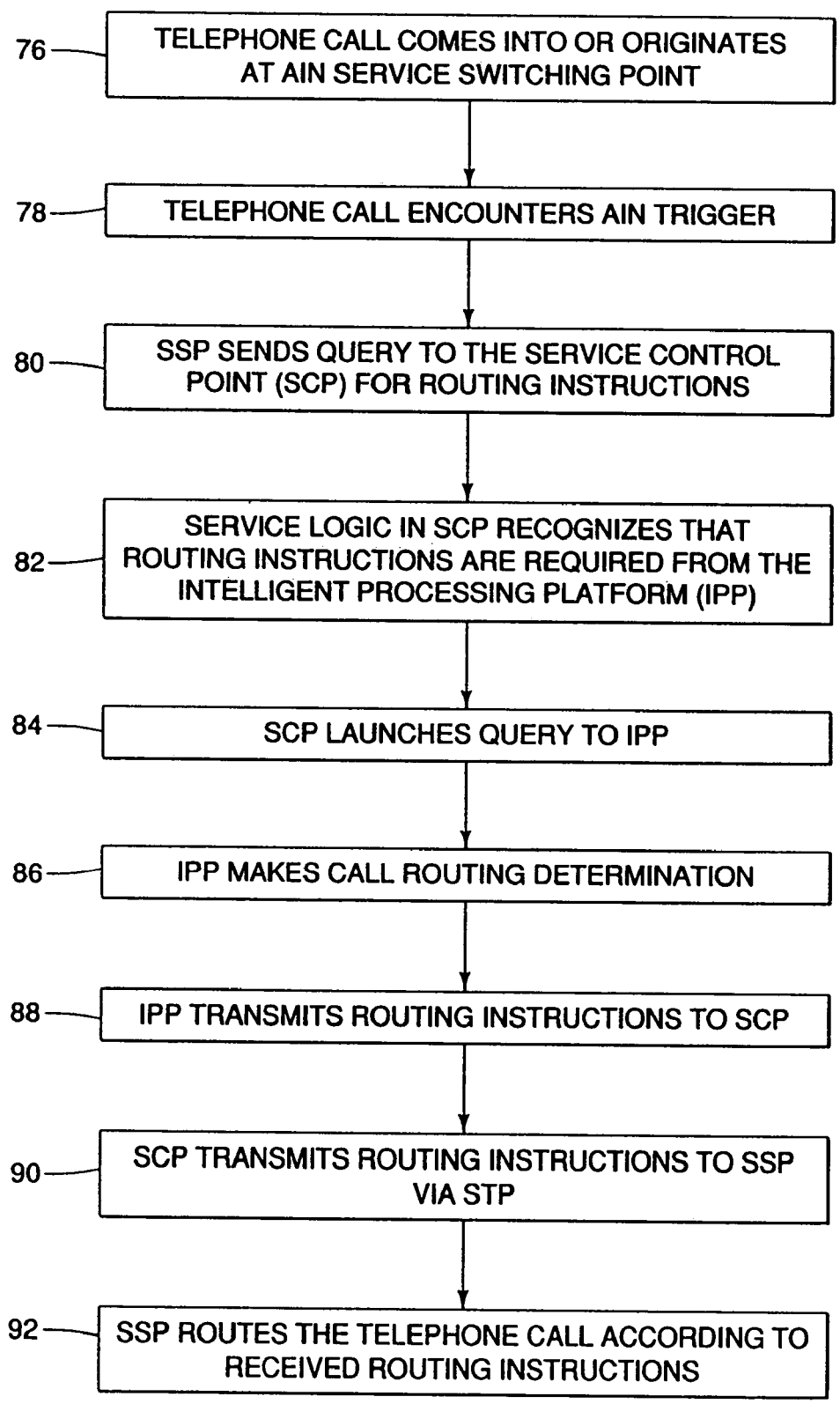
FIG. 4 is a flow diagram showing a preferred method of processing a caller-paid telephone call using the system of FIG. 1.

Utilizing the network 10 described above, a preferred method of utilizing the common architecture for routing both caller-paid telephone calls from a local exchange network 14 and toll free telephone calls from interexchange networks 12 using an intelligent processing platform 16 is described below. Referring to FIG. 4, a caller-paid telephone call in a local exchange network 14 comes in over a voice line or trunk to the SSP 38 (at step 76). the telephone call then encounters an AIN trigger (at step 78). Recognizing that the telephone call requires AIN processing, the SSP sends a query to the SCP 40 via the STP 42 for routing instructions (at step 80). The service logic 51 in the SCP 50 recognizes the call is directed to a call service center and will require the generation of a routing query message 52 to query the IPP for routing instructions (at step 82). The SCP next launches the query to the IPP 16 (at step 84). The routing query message 52 includes at least the dialed number 60. The message may also contain the calling party's number 62 and the other information described above.

In an alternative embodiment, the routing query message sent from the SCP to the IPP may only include a portion of the calling party's number 62 in order to preserve privacy. For example, if the local exchange network containing the SCP is owned by a first enterprise and the IPP is owned by a second enterprise, the first enterprise may only wish to disclose a portion of the calling party's number to the IPP. Preferably, the routing query message 52 contains enough of the calling party's number, such as the area code or the area code and prefix, to allow the IPP to make an informed routing determination.

In response to the routing query message the IPP accesses the customer routing script 63 associated with the dialed number 60. The customer routing script 63 is essentially a flow-chart or a list of rules indicating the actions to be taken when the particular dialed number 60 is received. Using the script 63 and information about the real-time activities at the customer's call centers 26 gathered by the gateways 32, the IPP 16 makes a routing determination (at step 86). The IPP then returns the routing destination in the routing response message 54 and sends it to the SCP 40 (at step 88). The route response 72 may be a 10 digit number or a trunk group with outpulse digits. Alternatively, the route response may be an international telephone number. The SCP 40 communicates with the SSP 38 over a data line connected by the STP communicating the routing destination for a telephone call (at step 90). The SSP subsequently routes the call to the indicated routing destination (at step 92). Separately or concurrently with the one or more telephone calls directed to the IPP from the local exchange network 14, the interexchange networks 12 may also be querying the IPP 16. The IPP 16 preferably gathers all the call information generated at the ACDs 30 and transmitted via the gateways 32 to make call routing determinations to optimize the use of agents 28 at the various call service centers 26.

In instances where there is a failure of communication between the SCP 40 and IPP 16, the SCP may utilize default instruction logic 76 to determine when default routing should be used. For example, in one embodiment, the SCP may wait for a predetermined interval before accessing the default instructions and then will route the call to a single predetermined number. Alternatively, the default instructions may include directions to send calls to one of several predetermined numbers on a percent allocation basis. Thus, the SCP would instruct the SSP to direct the call to one of a number of predetermined default call center destinations.

Figure 5:
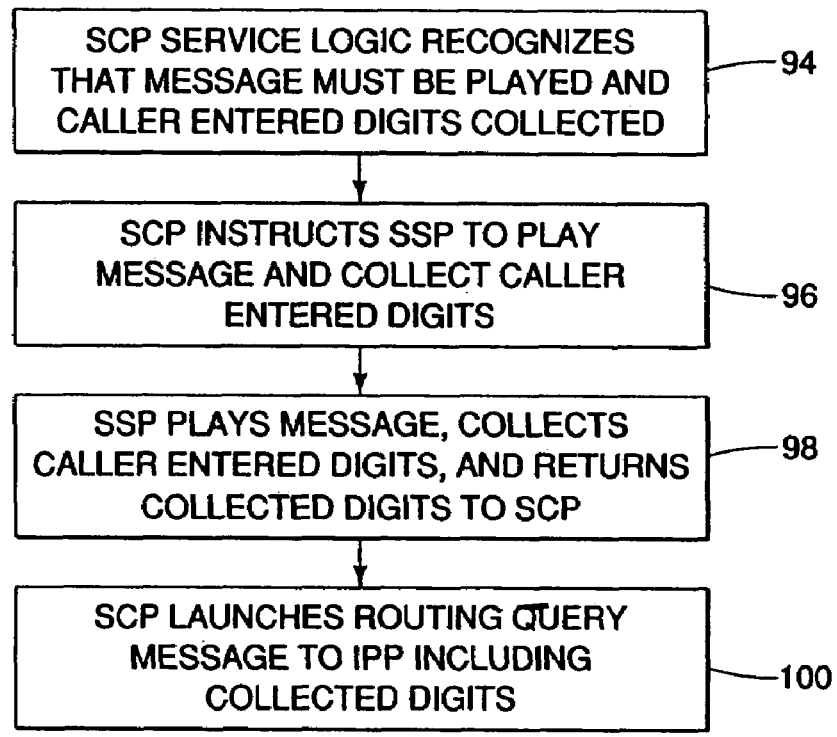
FIG. 5 is a flow diagram of an alternative method of processing a caller-paid telephone call in an advanced intelligent network.

As shown in FIG. 5, an alternative method of processing a caller-paid telephone call may include the SSP playing a message and collecting digits of the caller's response to the message. As in FIG. 4, when a call comes in to the SSP and it is recognized as an AIN call and as one destined for a call service center (FIG. 4, at steps 76-82). In this example, the service logic 51 indicates that a message needs to be played to the caller (at step 94). The SCP 40 instructs the SSP to play a particular announcement and collect digits from the caller (at step 96). This step may be repeated several times depending on the instructions from the SCP 44. In response to the SCP's instructions, the SSP plays the announcement, collects the digits from the caller and passes on the caller-entered digits to the SCP (at step 98). The SCP 40 then launches a query to the IPP including at least the dialed number 60 and the collected digits 64 (at step 100). The IPP 16 then accesses the customer routing script 63 associated with the dialed number, and then based on the routing script, the caller-entered digits and the information on the real time activities at the call centers, the IPP makes a routing determination at step 102. As discussed earlier, the IPP returns the destination and the call is routed to the appropriate destination (at steps 88-92).

Figure 6:
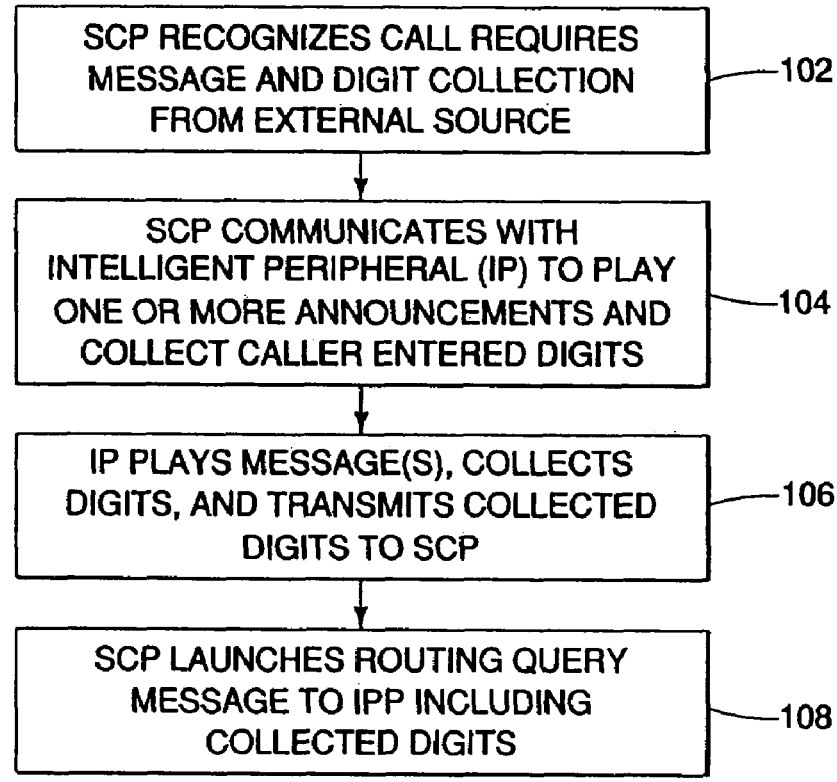
FIG. 6 is a flow diagram of a third alternative embodiment of a method of processing a caller-paid telephone call in an advanced intelligent network.

FIG. 6 illustrates an example where an external resource other than an SSP is used interact with the call. As before, the call is first recognized as an AIN call (FIG. 4, at steps 76-82). In this case, however, the service logic 51 indicates that a menu announcement should be played to the caller using an external source such as an IP 44 (at step 102). The SCP 40 then sends instructions to the IP over the data link 46 (via the SSP) indicating that a particular announcement or announcements should be played and digits collected from the caller (at step 104). The IP plays the announcements, collects the digits, and then passes the caller-entered digits to the SCP (at step 106). The SCP 40 then launches a query to the IPP including at least the dialed number 60 and the collected digits 64 (at step 108). Subsequently, the IPP 16 accesses the customer routing script 63 associated with the dialed number and returns a routing destination to the SCP in a routing response message 54. The SSP then routes the call to the appropriate destination.

The present system and method provide flexibility and advantages over the prior art. Business enterprises that are customers of local exchange networks may utilize the present common architecture for directing both local calls and long-distance calls through the common control of the IPP to reduce costs and maintain a local presence while still retaining the advantage of a centralized call distribution network. Thus not only can the same architecture be used, but the calls may be directed through common routing scripts.

Alternative embodiments include connecting to an interexchange network number rather than an interexchange network SCP so that the interexchange network toll-free number will route to a regular local number and then use the local exchange network SCP in a manner similar to that described previously. The caller interaction with a play and collect menu that occurs in the local exchange network 14 prior to the SCP querying the IPP for routing instructions can offer a time and cost savings to the business enterprise supporting the customer call service centers. According to an aspect of the present invention, the SCP for the local exchange network can pass a presentation restriction indicator (i.e., a caller ID block) and other information such as the originating station type (e.g., a pay phone, hotel/motel, etc.). With this information, the routing scripts in the IPP can treat calls differently if desired. Also, the AIN trigger may be a 3/6/10 digit public office dialing plan trigger, a specific digit string trigger, or a termination attempt trigger. The 3/6/10 digit public office dialing plan refers to triggering on a 3 digit number (area code), a 6 digit number (area code+prefix), or an entire 10 digit telephone number.

The system described above may be programmed to allow the AIN service logic 51 to only query for routing instructions in certain cases and not others. For example, the service logic 51 may specify that the SCP query for fifty percent of the calls and route the other calls to the dialed number. In other embodiments, the SCP 40 may query the IPP for further routing instructions in the event that an initial routing instruction given by the IPP results in a busy signal or no answer. In this case, the SCP will indicate to the IPP that a busy signal or no answer was encountered.

It is intended that the foregoing detailed description be regarded as illustrative rather than limiting and that it be understood that the following claims, including all equivalents, are intended to define the scope of this invention.

We claim:

1. A call processing system comprising:
a plurality of call service centers;
a processing platform configured to receive status information related to the plurality of call service centers, wherein the processing platform is in communication with a local exchange network and an interexchange network;
a network element in communication with the processing platform, the network element configured to communicate a call routing query to the processing platform in response to a call directed to one of the plurality of call service centers and received from the local exchange network or the interexchange network;
wherein the processing platform communicates call routing instructions to the local exchange network and the interexchange network, and wherein the call routing instructions are generated as a function of the status information related to the plurality of call service centers.

2. The system of claim 1, wherein at least one of the plurality of call service centers is disposed with a first geographic location and wherein at least one of the call service centers is disposed within a second geographic local that is different from the first geographic location.

3. The system of claim 1, wherein the call routing query is communicated to the processing platform via a data connection.

4. The system of claim 1 further comprising:
a call distributor in communication with the processing platform and the network element, wherein the call distributor is configured to route the call to an agent at one of the plurality of call service centers in response to the call routing instructions.

5. The system of claim 1, wherein the network element executes a routing script in response to the call.

6. The system of claim 5, wherein the routing script includes caller entered digits.

7. A method of call routing comprising:
receiving status messages at a processing platform from first and second call centers;

receiving a call routing query at the processing platform, wherein the call routing query is generated by a network element and is associated with a call received at the network element;

evaluating the call routing query and the status messages to determine call routing instructions; and transmitting the call routing instructions from the processing platform to a local exchange network and a interexchange network such that the call is directed to one of the first and second call centers.

8. The method of claim 7, wherein receiving status messages comprises receiving a first status from the first call center in a first geographic location and receiving a second status from the second call center in a second geographic location.

9. The method of claim 7, wherein transmitting the call routing instructions comprises transmitting a network identifier.

10. The method of claim 7, wherein transmitting the call routing instructions comprises preparing the call routing instructions based on a common routing script executed at the processing platform.

11. The method of claim 7, wherein receiving the call routing query comprises receiving information associated with at least one caller-entered digit associated with the call, and wherein transmitting call routing instructions comprises accessing a routing script associated with the network element receiving the call, and performing a routing determination based on the routing script, the at least one caller-entered digit and the status messages.

12. The method of claim 7, wherein receiving the call routing query associated with the call at the processing platform comprises receiving a routing query message in a routing query message format, wherein the routing query message format comprises information on a telephone number of a calling party of a caller-paid telephone call.

* * * * *